(12) United States Patent
Ingemann Hansen

(10) Patent No.: US 12,310,376 B2
(45) Date of Patent: May 27, 2025

(54) METHOD FOR TRIM BLENDING

(71) Applicant: Cabinplant International A/S, Haarby (DK)

(72) Inventor: Henning Ingemann Hansen, Haarby (DK)

(73) Assignee: CABINPLANT INTERNATIONAL A/S, Haarby (DK)

( * ) Notice: Subject to any disclaimer, the term of this patent is extended or adjusted under 35 U.S.C. 154(b) by 180 days.

(21) Appl. No.: 17/627,067

(22) PCT Filed: Jul. 9, 2020

(86) PCT No.: PCT/EP2020/069384
§ 371 (c)(1),
(2) Date: Jan. 13, 2022

(87) PCT Pub. No.: WO2021/008997
PCT Pub. Date: Jan. 21, 2021

(65) Prior Publication Data
US 2022/0264901 A1    Aug. 25, 2022

(30) Foreign Application Priority Data

Jul. 15, 2019    (EP) ..................................... 19186314

(51) Int. Cl.
*A22C 17/00*    (2006.01)
*B07C 5/18*    (2006.01)

(52) U.S. Cl.
CPC ...... *A22C 17/0093* (2013.01); *A22C 17/0073* (2013.01); *B07C 5/18* (2013.01)

(58) Field of Classification Search
CPC . A22C 17/002; A22C 17/0073; A22C 17/008; A22C 17/0093; A22B 5/0064;
(Continued)

(56) References Cited

U.S. PATENT DOCUMENTS

| 3,930,991 A | * | 1/1976 | Gillespie | ................ G01N 33/12 209/580 |
| 4,171,164 A | | 10/1979 | Donovan et al. | |

(Continued)

FOREIGN PATENT DOCUMENTS

| EP | 2936987 A1 | | 10/2015 |
| GB | 2116732 | * | 9/1983 |

(Continued)

OTHER PUBLICATIONS

International Search Report and Written Opinion from International Application No. PCT/EP2020/069384 dated Oct. 30, 2020.

*Primary Examiner* — David J Parsley
(74) *Attorney, Agent, or Firm* — Maschoff Brennan

(57) ABSTRACT

A method for batching articles constituted by solid food products having a first property and a first quantity. The first property may be lean degree and the first quantity may be weight. The method provides a conveyor system and a batcher having a plurality of batcher heads such that articles within the batcher heads may be selected and batched according to a first target range of the first property and a first target interval of the first quantity. The method may ensure that different grades of the first property may not contaminate each other.

5 Claims, 5 Drawing Sheets

(58) Field of Classification Search
CPC ........... A22B 5/0076; B07C 5/00; B07C 5/10; B07C 5/16; B07C 5/18
USPC ........ 452/181, 184; 209/571, 576, 577, 578, 209/589
See application file for complete search history.

(56) References Cited

U.S. PATENT DOCUMENTS

| | | | | |
|---|---|---|---|---|
| 5,215,772 | A * | 6/1993 | Roth | A22C 17/002 426/480 |
| 9,886,752 | B2 * | 2/2018 | Taylor | G01G 17/00 |
| 10,238,124 | B2 * | 3/2019 | Gardarsson | B01F 35/2117 |
| 2007/0293980 | A1 * | 12/2007 | Gudjonsson | A22C 17/0093 700/223 |
| 2012/0128838 | A1 * | 5/2012 | Virippil | G01N 33/12 382/110 |

FOREIGN PATENT DOCUMENTS

| | | | |
|---|---|---|---|
| WO | WO 2011/138052 | * | 11/2011 |
| WO | 2014/091006 A1 | | 6/2014 |

\* cited by examiner

| | | |
|---:|---:|---:|
| 1 | 69,2 | 8,7 |
| 2 | 96,3 | 6,4 |
| 3 | 65,8 | 5,8 |
| 4 | 99,3 | 8,6 |
| 5 | 79,5 | 7,0 |
| 6 | 78,6 | 8,2 |
| 7 | 75,8 | 7,3 |
| 8 | 81,3 | 7,1 |
| 9 | 92,9 | 9,2 |
| 10 | 82,6 | 9,0 |
| 11 | 76,9 | 9,5 |
| 12 | 91,3 | 4,6 |
| 13 | 68,9 | 7,2 |
| 14 | 79,3 | 5,6 |
| 15 | 83,9 | 8,4 |
| 16 | 66,2 | 5,1 |
| 17 | 70,3 | 9,9 |
| 18 | 74,1 | 6,2 |
| 19 | 78,6 | 4,5 |
| 20 | 81,6 | 6,9 |
| 21 | 88,1 | 4,0 |
| 22 | 65,0 | 6,6 |
| 23 | 81,8 | 9,4 |
| 24 | 84,4 | 4,6 |
| 25 | 69,1 | 6,3 |
| 26 | 90,2 | 8,0 |
| 27 | 98,8 | 3,6 |
| 28 | 91,6 | 9,5 |
| 29 | 62,5 | 5,4 |
| 30 | 87,1 | 6,4 |
| 31 | 78,5 | 8,7 |
| 32 | 89,7 | 7,7 |
| 33 | 78,3 | 7,3 |
| 34 | 96,5 | 4,5 |
| 35 | 68,3 | 7,3 |
| 36 | 97,5 | 6,2 |
| 37 | 65,7 | 5,8 |
| 38 | 84,2 | 8,3 |
| 39 | 64,9 | 5,2 |
| 40 | 65,0 | 8,1 |
| | 62,5 | 3,6 |
| | 99,3 | 9,9 |
| | 80,0 | 7,0 |

Fig. 2

| | | |
|---:|---:|---:|
| 1 | 27,2 | 76,0 |
| 2 | 27,4 | 84,2 |
| 3 | 27,3 | 85,1 |
| 4 | 27,3 | 74,7 |
| 5 | 27,3 | 76,4 |
| 6 | 27,3 | 94,3 |
| 7 | 27,3 | 84,7 |
| 8 | 27,4 | 84,7 |
| 9 | 27,3 | 65,6 |
| 10 | 27,3 | 85,6 |
| 11 | 27,3 | 74,3 |
| 12 | 27,2 | 65,2 |
| 13 | 27,2 | 74,8 |
| 14 | 27,2 | 66,1 |
| 15 | 27,2 | 75,6 |
| 16 | 27,2 | 84,7 |
| 17 | 27,2 | 66,6 |
| 18 | 27,2 | 74,6 |
| 19 | 27,2 | 85,1 |
| 20 | 27,2 | 95,4 |
| 21 | 27,3 | 85,1 |
| 22 | 27,2 | 74,3 |
| 23 | 27,2 | 64,8 |
| 24 | 27,3 | 74,7 |
| 25 | 27,2 | 84,0 |
| 26 | 27,3 | 76,2 |
| 27 | 27,3 | 96,0 |
| 28 | 27,2 | 66,6 |

Fig. 3

| 60 | 80 | 81 | 100 |
|---|---|---|---|
| 69,2 | 8,7 | | |
| | | 96,3 | 6,4 |
| 65,8 | 5,8 | | |
| | | 99,3 | 8,6 |
| 79,5 | 7,0 | | |
| 78,6 | 8,2 | | |
| 75,8 | 7,3 | | |
| | | 81,3 | 7,1 |
| | | 92,9 | 9,2 |
| | | 82,6 | 9,0 |
| 76,9 | 9,5 | | |
| | | 91,3 | 4,6 |
| 68,9 | 7,2 | | |
| 79,3 | 5,6 | | |
| | | 83,9 | 8,4 |
| 66,2 | 5,1 | | |
| 70,3 | 9,9 | | |
| 74,1 | 6,2 | | |
| 78,6 | 4,5 | | |
| | | 81,6 | 6,9 |
| | | 88,1 | 4,0 |
| 65,0 | 6,6 | | |
| | | 81,8 | 9,4 |
| | | 84,4 | 4,6 |
| 69,1 | 6,3 | | |
| | | 90,2 | 8,0 |
| | | 98,8 | 3,6 |
| | | 91,6 | 9,5 |
| 62,5 | 5,4 | | |
| | | 87,1 | 6,4 |
| 78,5 | 8,7 | | |
| | | 89,7 | 7,7 |
| 78,3 | 7,3 | | |
| | | 96,5 | 4,5 |
| 68,3 | 7,3 | | |
| | | 97,5 | 6,2 |
| 65,7 | 5,8 | | |
| | | 84,2 | 8,3 |
| 64,9 | 5,2 | | |
| 65,0 | 8,1 | | |
| 71,5 | 6,9 | 89,4 | 7,0 |
| | 21,0 | | 19,0 |

Fig. 4

METHOD FOR TRIM BLENDING

RELATED APPLICATIONS

The present application is a national phase filing under 35 USC 371 of International Application No. PCT/EP2020/069384, filed on Jul. 9, 2020, which claims priority from European Patent Application No. 19186314.1, filed on Jul. 15, 2019, the contents of which are incorporated herein in their entirety for all purposes.

The present invention relates to a method and a system for batching articles constituted by solid food products, such as trimmed meat pieces, having a first property and a first quantity, preferably for batching articles according to weight and lean degree, such that trimmed meat pieces having a substantial difference in lean degree are not mixed and do not contaminate each other.

An example of a method for batching meat trim products is disclosed in EP2936987, which shows a top-up method wherein a plurality of batching stations placed one after the other along a conveyor belt fill up a plurality of batches as meat trim pieces are transported along the conveyor belt. If a specific batch ends up with a useful combination of weight and lean degree, it may be packaged and shipped.

It is an object of the present invention to control the batching process and increase the speed of the batching process and reduce the number of articles having to be recycled.

The above object and advantages, together with numerous other objects and advantages, which will be evident from the description of the present invention, are according to a first aspect of the present invention obtained by:

A method for batching articles constituted by solid food products having a first property and a first quantity, said method comprising:
providing a conveyor system including:
 an inlet for receiving said articles,
 one or more analyzing devices for determining a first property value of said articles,
 one or more measuring devices for determining a first quantity value of said articles, and
 a batcher for batching a batch of articles, said batcher having a plurality of batcher heads for having at least one article in each batcher head,
said method further comprising:
introducing said articles into said inlet of said conveyor system,
determining said first property value and said first quantity value of said articles by means of said one or more analyzing devices and said one or more measuring devices,
distributing said articles into said plurality of batcher heads such that each respective batcher head has at least one article,
defining a first target range for said first property,
defining a first target interval for said first quantity,
selecting a combination of batcher heads from said plurality of batcher heads such that the articles of said combination of batcher heads have an average value of said first property within said first target range and an average value of said first quantity within said first target interval, and
batching the articles of said combination of batcher heads into said batch.

The terms 'interval' and 'range' refer to numbers between a lower number/end point and an upper number/end point, where the second number is higher than the first number.

The terms 'property' and 'quantity' refer to a characteristic of the article. The first property may be the lean degree of an article, whereas the first quantity may be the weight of an article or vice versa. Other properties or quantities that may alternatively be measured are e.g. water contents, bone or bone marrow contents, and tendon contents.

For example, if the first property is the lean degree, the first target range may be chosen as being a lean degree between 60 and 80. i.e. the batch is to have an average lean degree between 60 and 80.

If the first quantity is the weight, the first target interval may be chosen as being a weight between 27 and 30 kg, i.e. the batch is to have a combined weight of the articles between 27 and 30 kg. When it comes to the weight, it may be preferred to batch such that the batch weight is as close as possible to the lower end point of the target interval—or at least closer to the lower end point than to the upper end point, but at least equal to or greater than the lower end point.

The lower end point of the first target interval may constitute a minimum target for the first quantity, i.e. the batch is to fulfill at least the minimum target—a minimum weight for example.

The batching may be performed such that the first quantity takes priority over the first property. Thus, if the batcher heads have articles such that no combination may be achieved, and such that the first property is within the first target range and the first quantity is within the first target interval, the batching may be such that the first quantity is within the first target interval and the first property is greater than the upper end point of the first target range. If all of the articles are of high lean degree (above 85 for example) and the target range for the lean degree is 60 to 80, then articles are selected such that the lean degree of the batch is above 85. Articles are selected such that the first property has a value as close as possible to the upper end point of the first target range.

Alternatively, the batching may be so that the batch has a value of the first quantity which is above the lower end point of the first target interval, but not as close as possible to the lower end point of the first target interval, while the first property has a value within the first target range. Thus, if the target weight is 27 kg and the target lean is between 60 and 80, it may be such that it is only possible to be in that range if the batch weight becomes 28 kg.

According to a second aspect of the present invention the above objects and advantages are obtained by:

A method for batching articles constituted by solid food products having a first property, said method comprising:
 providing a conveyor system including:
  an inlet for receiving said articles,
  one or more analyzing devices for determining a first property value of said articles, and
  a batcher for batching a batch of articles, said batcher having a plurality of batcher heads for having at least one article in each batcher head,
 said method further comprising:
 introducing said articles into said inlet of said conveyor system,
 determining said first property value of said articles by means of said one or more analyzing devices,
 distributing said articles into said plurality of batcher heads such that each respective batcher head has at least one article,
 defining a first target range for said first property,
 defining a second target range for said first property,
 selecting a combination of batcher heads from said plurality of batcher heads such that the batcher heads of said combination of batcher heads exclusively comprise articles having said first property value within said first target range or such that the batcher heads of said combination of batcher heads exclusively comprise articles having said first property value within said second target range, and batching the articles of said combination of batcher heads into said batch.

The first property may be the lean degree of an article. Other properties that may alternatively be measured are e.g. water contents, bone or bone marrow contents, and tendon contents.

For example, if the first property is the lean degree, the first target range may be chosen as being a lean degree between 60 and 80. The second target range may be chosen as being a lean degree between 80 and 100, i.e. the second target range may be set to being a range with an upper end point higher than the upper end point of the first range. The lower end point of the second target range may also be set to be higher than the lower end point of the first range.

If a target number of articles is to be batched, for example four articles, those articles are either selected from the first target range or the second target range. An article having a first property value in the first target range is not mixed into a batch where the other articles all have values of the first property within the second target range, so that a low lean article is not mixed with high lean articles.

A first target interval may be specified for a first quantity of the articles such as a target interval for the weight of a batch of articles. The articles from either the first target range or the second target range may then be selected so that the batch weight is within the first target interval.

The end points of the first target range and the second target range may be varied.

Each analyzing device may be an X-ray apparatus or laser for analyzing/measuring the property such as the lean degree. An analyzing device may be placed before an article enters the batcher. The property of the articles may be measured one by one, and a processing unit keeps track of into which batcher head an article with an analyzed property goes.

Each batcher head may alternatively be associated with an analyzing device. For example when an article is placed in a batcher head, an analyzing device analyzes the article to determine for example the lean degree.

Each measuring device may be a weight for weighing the article. A measuring device may be placed before an article enters the batcher. The property of the articles may be measured one by one, and a processing unit keeps track of into which batcher head an article with a measured property goes.

Each batcher head may alternatively be associated with a measuring device. For example when an article is placed in a batcher head, a measuring device measures the article to determine for example the lean degree. Thus, the batcher head may comprise a weight into which an article is placed.

A buffer container may be used to accumulate articles with a first property within a first interval such as the first target range, such that when a certain amount of articles has been accumulated, there is enough articles to process those articles in a first time period.

A second buffer container may be used to accumulate articles with a first property within a second interval such as the second target range, such that when a certain amount of articles has been accumulated, there is enough articles to process those articles in a second time period.

According to a third aspect of the present invention, the above objects and advantages are obtained by:

A system for batching articles constituted by solid food products having a first property and a first quantity, said system comprising:

a conveyor system,
one or more analyzing device for determining a first property of said articles,
one or more measuring devices for determining a first quantity value of said articles,
a batcher for batching a batch of articles, said batcher having a plurality of batcher heads for having at least one article in each batcher head,
a processing unit including a memory for storing said first property value and said first quantity value of the respective articles in each of said plurality of batcher heads determined by means of said one or more measuring devices and said one or more analyzing device during use of said system,
said memory including a first target range for said first property, and a first target interval for said first quantity,
said processing unit being configured for selecting a combination of batcher heads from said plurality of batcher heads such that the articles of said combination of batcher heads have an average value of said first property within said first target range and an average of said first quantity within said first target interval,
said system further comprising a bin for receiving the articles of said combination of batcher heads.

According to a fourth aspect of the present invention, the above objects and advantages are obtained by:

A system for batching articles constituted by solid food products having a first property, said system comprising:

a conveyor system,
one or more analyzing device for determining a first property value of said articles,
a batcher for batching a batch of articles, said batcher having a plurality of batcher heads for having at least one article in each batcher head,
a processing unit including a memory for storing said first property value of the respective articles in each of said plurality of batcher heads determined by means of said analyzing device during use of said system,
said memory including a first target range for said first property, and a second target range for said first property,
said processing unit being configured for selecting a combination of batcher heads from said plurality of batcher heads, such that the batcher heads of said combination of batcher heads exclusively comprise articles having said first property value within said first target range or such that the batcher heads of said combination of batcher heads exclusively comprise articles having said first property value within said second target range,
said system further comprising a bin for receiving the articles of said combination of batcher heads.

The invention will now be explained in more detail below by means of examples with reference to the accompanying drawings, in which:

FIG. 2 is an exemplary illustration of a table of the lean degree and weight for the trim pieces in the 40 batcher heads.

FIG. 3 is an illustration of a table of the lean degree and weight for 28 exemplary batches.

FIG. 4 is an illustration of a table wherein the 40 batcher heads have been divided into two target ranges of lean degrees.

Figure 1A:
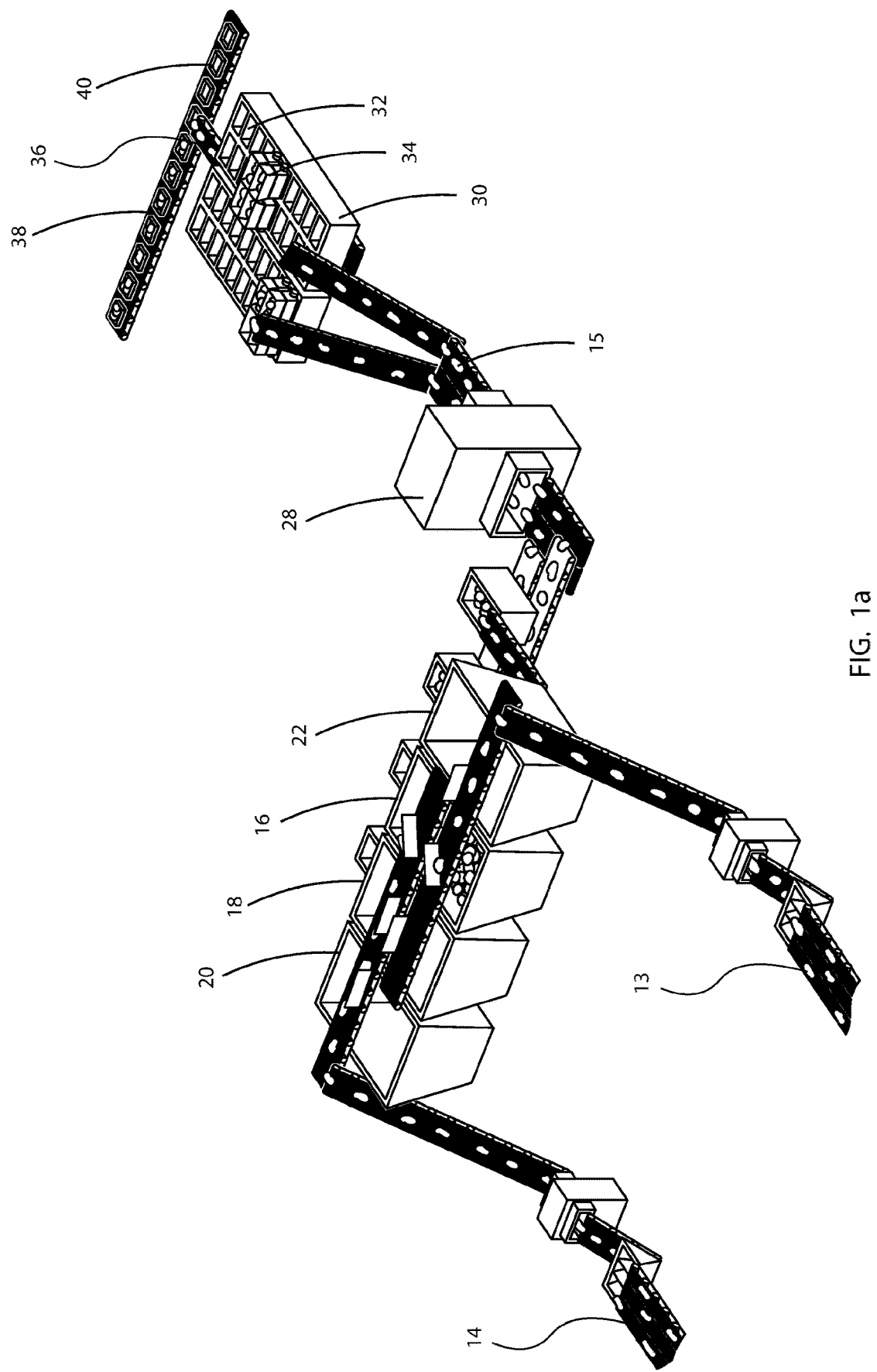
FIG. 1a shows a system 10 for a slaughterhouse for batching articles constituted by solid food products having a first property and a first quantity.

The invention may however be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure.

FIG. 1a shows a system 10 for a slaughterhouse for batching articles constituted by solid food products having a first property and a first quantity. The system is shown from bird's-eye view.

Figure 1B:
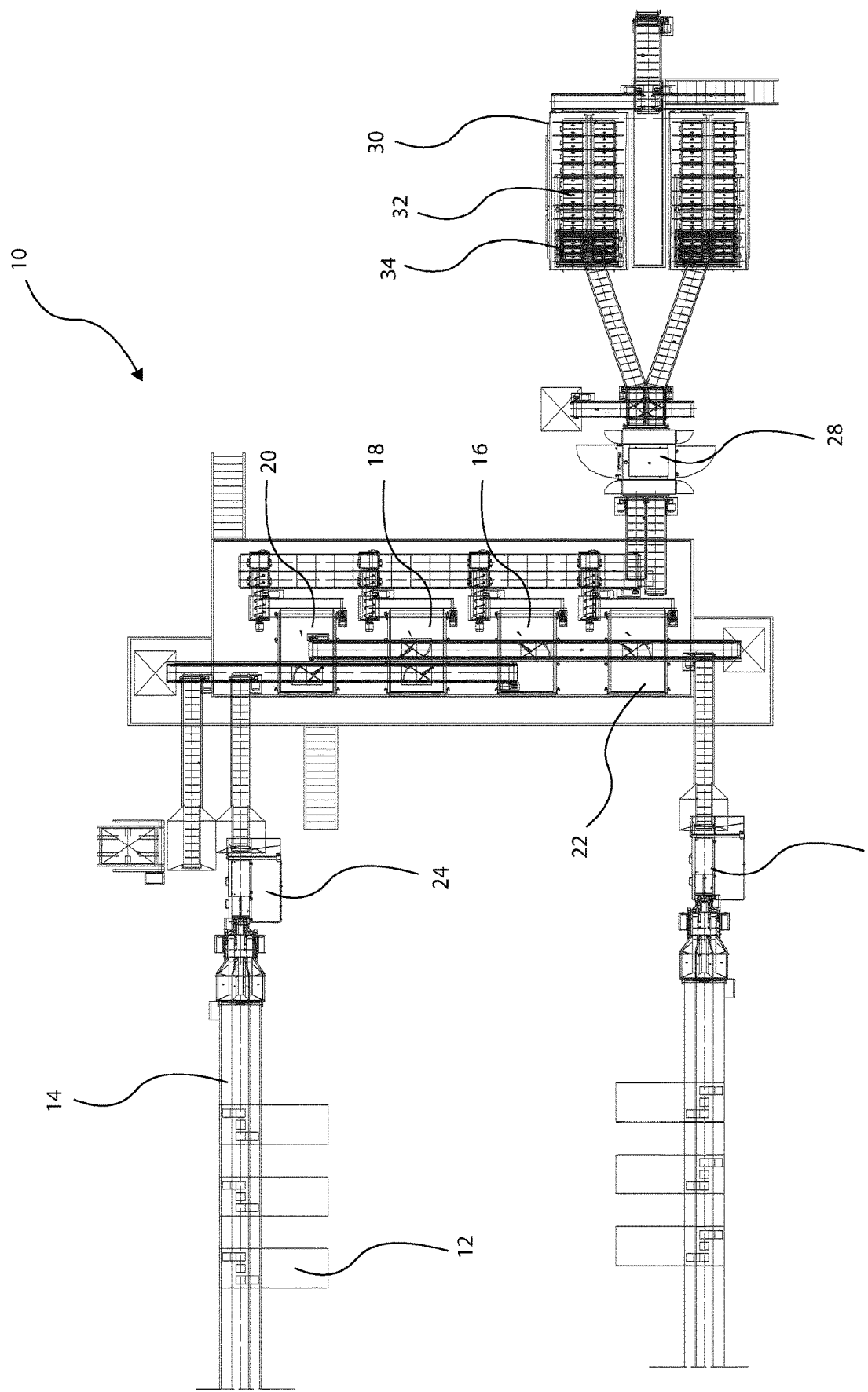
FIG. 1b shows a system 10 for a slaughterhouse for batching meat in batches specified by a minimum weight and a meat property/quality such as lean degree.

FIG. 1b shows a system 10 for a slaughterhouse for batching meat in batches specified by a minimum weight and a meat property/quality such as lean degree. The system is shown from a perspective when looking down on the system from above.

Six trim tables are shown, such as a first trim table 12. The trim tables are arranged in two rows (trim lines) parallel to each other, with three trim tables in each row, i.e. looking at the figure, the upper three trim tables constitute the left trim tables, and the lower three trim tables constitute the right trim tables (the trim table 12 being the first of the three left trim tables).

Butchered animal carcasses are transported (usually hanging from a ceiling conveyor) to the area between the three trim tables to the right and the three trim tables to the left by means of a ceiling conveyor in which the carcasses hang from (not shown). The carcasses are split in two halves so that one half is processed by one or more of the trim tables to the right, and the other half is processed by one or more of the trim tables to the left.

The number of trim tables on either side of the carcass ceiling conveyor may vary on either side. Only one trim line may be necessary.

Leading away from each trim table are three parallel trim table conveyor belts such as a first trim table conveyor belt 14. The three conveyor belts go by each trim table. There are three parallel conveyor belts for each line of trim tables.

Each of the three conveyor belts are designated to a specific property of the article; in this case the lean degree/grade (ranging from 1 to 3, with 1 being the best) of the meat, i.e. the quality of the meat is divided in three categories/grades. As an example, grade 3 may be pure fat or a little bit of bone with fat and meat attached thereto. Grade 1 may be meat which is suitable for retail cuts of for example high tenderness. Grade 2 may be the average meat quality. The three grades could also designate the tendon contents or another property of the articles.

Thus, the butcher/trim table operator at a given trim table cuts off a primal cut 13 of the carcass and trims it. It may be cut into smaller pieces. In any case, it is assessed at which conveyor belt a particular piece of trim is to be placed, i.e. the trim table operator is to select those cuts necessary for achieving optimum product value and minimizing loss, and distribute the cuts accordingly onto the three conveyor belts.

The trim levels may vary such that instead of three levels there may only be two levels, for example trim pieces having either a low or high lean degree.

Each of the three conveyor belts leads to a buffer container, i.e. a buffer container for each grade of the property of the article. There are a total of four buffer containers. One buffer container 16 for grade 1, one buffer container 18 for grade 3, and two buffer containers for grade 2 (a left container 20 and a right container 22), because the highest percentage of the carcass weight is grade 2).

A buffer container is not necessary per se, but it allows for collecting a number of articles with a given grade and process those articles in a time period such that the system does not switch from processing one grade, then another, and then another again.

On the way to a container, the trim pieces such as a first trim piece 15 may go through a chopper or cutter (a left chopper 24 and a right chopper 26), which cuts a trim piece into a size with a weight ranging from 0.5 kg to 1.5 kg. The size/chopping may be varied.

From a respective buffer container, a trim piece may be transported to an analyzing device for analyzing its property; in this case an x-ray machine 28 for a fat measurement/analysis. The lean degree is the inverse of the fat contents. The analyzing device may also analyze another property of the article.

From the x-ray, the article or trim piece is transported to a batcher 30. In FIG. 1a/1b, the batcher has 40 batcher heads (such as a first batcher head 32) arranged as four rows with 10 batcher heads in each row. The batcher may be a linear batcher where the batcher heads are arranged on a line, or the batcher may be a circular batcher where the batcher heads are arranged on a circle.

The number of batcher heads may vary depending on the type of articles and the processing speed.

A distributor 34 may distribute articles into the 40 batcher heads. For a linear batcher, the distributor moves back and forth along the line of the batchers heads. Two distributors are shown in FIG. 1a/1b, but the number of distributors may vary.

A single trim piece is placed in each batcher head by a distributor. A computer/processing unit having a memory keeps track of the filling of batcher heads, i.e. the distributor is to fill empty batcher heads. The batcher empties different batcher heads at different times, so the distributor moves around depending on which batcher head has been emptied.

Each batcher head comprises a measuring device for measuring a first quantity of an article, in this case a weight for weighing the article or trim piece placed in the batcher head. Alternatively, each article may be weighed before it is placed in a batcher head, for example in connection with the analysis of the first property, i.e. the analyzing device may be combined with a measuring device.

The processing unit may also keep track of the analyzed and measured properties of the article, in this case the lean degree and weight of the article in a batcher head that contains an article, for example in the form of a table associating each batcher head with the weight and lean degree of the trim piece in the batcher head at a given point in time.

The purpose of the batcher is to batch trim pieces into a batch with a specified weight—or another property, and avoid that a batch having a weight/property that does not meet the specification or a weight/property that is so above the specification that it reduces the profit margin is shipped off.

In addition, the lean degree or other analyzed property is accounted for. The processing unit follows a set of instructions, so that it finds the best combination of articles given a specific set of criteria, which is further explained in the following.

FIG. 2 is an exemplary illustration of a table of the lean degree and weight for the trim pieces in the 40 batcher heads.

The first column is simply the numbers of the batcher heads going from 1 to 40. The second column is the lean degree/first property of the article in each batcher head, and the third column is the weight/first quantity of the article in each batcher head.

The trim piece having the lowest weight has a weight of 3.6 kg and it is located in batcher head number 27.

The trim piece having the highest weight has a weight of 9.9 kg and it is located in batcher head number 17.

The rest of the trim pieces have a weight between those two values. The average weight of the 40 trim pieces in the table is 7 kg.

If the target weight of a batch is set to for example 27 kg, the batch should not weigh less than that, but it should also not end up with a weight being much larger than 27 kg, i.e. a target range ranging from 27 to infinity wherein it is attempted to combine articles such that the weight of the articles constituting the batch is within that range, and preferably as close as possible to the lowest end of the range.

It is contemplated that the weights are cut by the cutter 24 such that a natural number of articles may be combined if they are not cut by the trim table operator into suitable sizes/weights. The articles may have been cut into sizes such that a determined number of articles may be used to constitute a batch, i.e. if a batch is to have a weight of 27 kg, the cutter may cut such that the articles on average weigh 7 kg. Thus, in view of the target range of the weight, a target number of articles may be defined such that the target number multiplied with an average article weight results in a weight within the target range.

Since the average weight in the exemplary table is 7 kg, it is contemplated that the processing unit seeks to calculate the combined weight of trim pieces in four batcher heads (since the average weight is 7 kg).

This calculation may be done for all combinations of batcher heads in order to find the combination of batcher heads resulting in a batch weight being greater than, but as close as possible to 27 kg.

The trim piece having the lowest lean has a lean degree of 62.5 and is located in batcher head number 29.

The trim piece having the highest lean has a lean degree of 99.3 and is located in batcher head number 4.

The rest of the trim pieces have a lean degree between those two values (an average of 80).

The trim pieces are normally sold as a function of lean degree. Thus, a trim piece with a relative high lean degree may be sold at a higher price/weight ratio than a trim piece having not so high a lean degree.

Thus, a batch being the result of four trim pieces with a high lean degree is worth more than a batch being the result of four trim pieces with a lower lean degree.

Lean specifications may be set up so that a batch should not only have a specified weight, but also a lean degree at least in a specified range, i.e. for example above a lean degree of 80.

For such batches the number of possible ways of combining the 40 batcher heads is reduced, because not all combinations results in a lean degree of the batch which meets the specification/criteria.

Thus, a further restriction is set on the combination of batcher heads, which may result in the batch weight being higher than it would have been had there not been a restriction with respect to the lean degree.

As before, the processing unit determines which combination of batcher heads results in a batch weight being above and as close to the target, but also within the target range of lean degree.

The lean degree of a batch may be determined as the average of the lean degree of the trim pieces being combined.

When the processing unit has selected which batcher heads have the right articles in order to form a batch, it sends signals to the actuators of the batcher heads so that they are emptied, and the articles from each batcher head are combined to a batch. The batcher head may have an exit flap which may be opened upon emptying, or it may rotate 180 degrees, such that the article falls out.

The selected batcher heads are emptied substantially in parallel such that the articles that fall from the batcher heads may be combined into a batch. The selected articles may be emptied directly into a package.

In FIG. 1a it is illustrated that the articles from the selected batcher heads that have been emptied may be received on a batch conveyor 36 below the batcher, and transported to a package conveyor 38 having packages such as a first package 40 for receiving the batches.

FIG. 3 is an illustration of a table of the lean degree and weight for 28 exemplary batches.

The 28 exemplary batches are all batches that may be combined from the contents of the forty batcher heads and which have a batch weight above the target weight, which is the reason why the table only has 28 batcher heads. It is not possible to combine any of the remaining 12 batcher heads in a way such that the target weight is met without the loss of profit.

The first column in FIG. 3 is simply the numbers of the batches, going from 1 to 28. The second column is the batch weight, and the third column is the average lean degree of a batch.

In the example, 14 of the possible batches have a target weight of 27.2 kg, which is the weight closest to the target weight, while still being above the target weight. The remaining possible batches have a higher weight. These 14 batches may be shipped at different prices because of the different lean degrees.

It can be seen that four of the possible batches have a lean degree above 80.

It is contemplated that batches having a lean degree within a target range may be batched in time intervals, i.e. in a first time interval batches are batched having a lean degree in a first target range. This is the reason for the possible buffer containers at the end of the trim table conveyor belts.

In a second time interval (possibly following the first time interval), batches having a lean degree in a second target range are batched (The first target range may be lower than the second target range, or the ranges may overlap) are batched.

When a batcher head is emptied into a batch, it is filled up with a new trim piece. There may also be more than one trim piece in a batcher head.

FIG. 4 is an illustration of a table wherein the 40 batcher heads have been divided into two target ranges of lean degrees.

Trim pieces with a high lean degree are in relatively high demand, and it may be a problem if there is not enough trim pieces with a high lean. The batcher system may be used to ensure that there is enough trim pieces.

The first target range is a lean degree from 60 to 80, and the second target range is a lean degree from 81 to 100.

Within the first target range are 21 articles, and within the second target range are the remaining 19 articles, which have a higher lean degree than the 21 articles within the first target range.

Thus, the first column shows the lean degree of each article within the first target range, and in the second column is shown the weight of those articles.

The third column shows the lean degree of each article within the second target range, and in the fourth column is shown the weight of those articles.

By such a division/separation of articles, it is possible to keep the resulting batches noncontaminated, i.e. it is possible to avoid a batch where one trim piece has a very low lean degree and another has a very high lean degree.

Instead, the four batcher heads for a batch, which is to have an average lean degree within the second range, are exclusively selected from the fourth column.

In the end it becomes possible to select batcher heads which result in batches having a higher lean degree. And it is possible to use more of the slaughtered animal and reject less, i.e. the butcher may be less strict with the cutting, because trim pieces with very different lean degrees are not mixed, so trim pieces with a low lean degree do not contaminate, and they may be mixed with other trim pieces of low lean degree and make up batches of a low average lean degree, which may however still be sold, although at a lower price point.

The number of target ranges may very. In FIG. 4 two target ranges are shown, but more than two target ranges may be contemplated, such as three target ranges, or four target ranges for a finer intervals of lean. Thus, a third target range for the first property may be defined.

The end points of each target range may be varied for varying the number of batcher heads having articles with a lean degree within the target range, i.e. the greater the target range, the more batcher heads will have articles with a lean degree within the target range.

Either the lower end point or the upper end point, or both end points, may be varied.

In the case with two target ranges, the upper end point of the first target range will vary with the lower end point of the second target range. They either go up or down.

For example in FIG. 4, the lower end point of the second target range may be increased (for example from 81 to 82), and the upper end point of the first target range may be increased (from 80 to 81). This will result in the three batcher heads (originally shown contained in the first target interval) having the articles with leans degrees 81.3, 81.6, 81.8 being now contained in the first target range.

Such a variation of end points means that it is possible to adapt the batching to a demand. The operator of the system may specify the targets ranges (and end points).

Below is a list of reference signs used in the detailed description of the invention and in the drawings referred to in the detailed description of the invention.

10 System for a slaughterhouse
12 Trim table
13 Primal cut
14 Trim table conveyor
15 Trim piece
16 Buffer container
18 Buffer container
20 Buffer container
22 Buffer container
24 Chopper
26 Chopper
28 X-ray machine
30 Batcher
32 Batcher head
34 Distributor
36 Batch conveyor
38 Package conveyor
40 Package

The invention claimed is:

1. A method for batching articles constituted by solid food products having a first property and a first quantity, said method comprising:
    providing a conveyor system including:
        an inlet for receiving said articles,
        one or more analyzing devices for determining a first property value of said articles,
        one or more measuring devices for determining a first quantity value of said articles, and
        a batcher for batching a batch of articles, said batcher having a plurality of batcher heads for having at least one article in each batcher head;
    said method further comprising:
        introducing said articles into said inlet of said conveyor system,
        determining said first property value and said first quantity value of said articles by
    means of said one or more analyzing devices and said one or more measuring devices, providing a batcher with a first plurality of batcher heads and distributing said articles into said first plurality of batcher heads, such that each respective batcher head has at least one article,
    defining a first target range for said first property,
    defining a first target interval for said first quantity,
    emptying a second plurality of batcher heads, and
    conveying the articles from said second plurality of batcher heads into a batch package such that the articles of said batch package have an average value of said first property within said first target range and an average value of said first quantity within said first target interval.

2. The method according to claim 1, comprising:
    selecting said combination of batcher heads from said plurality of batcher heads such that the articles of said combination of batcher heads have an average value of said first quantity closest to a lower end value of said first target interval out of all possible combinations of batcher heads.

3. The method according to claim 1, said first property being the lean degree of an article.

4. The method according to claim 1, said first quantity being the weight of an article.

5. The method according to claim 1, said first target range having a first lower end point and a first upper end point, said method comprising varying either said first lower end point or said first upper end point such that a length of said first target range is increased for increasing the number of batcher heads having articles with values of said first property within said first target range.

* * * * *